United States Patent Office 3,375,300
Patented Mar. 26, 1968

3,375,300
COMPOSITIONS CONTAINING MALEIC ANHYDRIDE - POLYPROPYLENE GRAFT COPOLYMERS, AND A FATTY ACID POLYAMIDE OR AN AMINE ALDEHYDE RESIN
Walter S. Ropp, Mockingbird Hills, Del., assignor to Hercules Incorporated, a corporation of Delaware
No Drawing. Filed Dec. 31, 1964, Ser. No. 422,521
7 Claims. (Cl. 260—857)

ABSTRACT OF THE DISCLOSURE

Compositions are disclosed comprising a maleic anhydride-modified propylene polymer containing as a cross-linking agent a composition containing a plurality of epoxide groups, a polyamide resin or etherified amine aldehyde resin. These are useful as primers for adhering an unmodified propylene polymer to wood or metal. The coated compositions thus exhibit improved resistance to a salt spray atmosphere.

---

The present invention relates to a new composition of matter especially useful as a primer for coating metal. More particularly, the composition of the invention comprises a maleic anhydride-modified propylene polymer and a minor amount of a cross-linking agent therefor.

According to a prior unpublished proposal, it has been found that maleic anhydride-modified propylene polymers, i.e., solid polymers of propylene, which have been chemically combined with from about 0.05 to about 5% by weight of maleic anhydride, are excellent primers for the coating of metal. An outstanding characteristic of such primers is their adhesion to metal. However, in ionic environments such as are frequently encountered under use conditions, metal coated by the use of such primers is sensitive, even when topcoated, to underfilm corrosion creepage if a flaw is present in the coating. Corrosion creepage is manifested by rusting of the metal substrate and loss of adhesion between the metal and the coating. This defect is particularly noticeable when the primer coating is relatively thick, e.g. about 0.1 to 1 mil. Thus the problem can be alleviated somewhat by using thinner coatings. However, such thinner coatings are marginally acceptable or totally unacceptable in many cases.

In accordance with the present invention, there has been found a particular group of additives, which, when combined with the maleic anhydride-modified propylene polymer, are capable of cross-linking the polymer by reaction with its anhydride or carboxylic acid functional group, and thereby reduce considerably the susceptibility to underfilm rust creepage when used as a metal primer. The additives useful for this purpose are selected from the class consisting of compounds containing a plurality of epoxide functional groups, etherified amine-aldehyde resins, and polyamide resins. One or more of these additives are simply combined in small amount with a maleic anhydride-modified propylene polymer and then the composition is applied by conventional techniques as a metal primer, and subsequently topcoated with any desired coating composition, e.g. crystalline or amorphous polypropylene.

The compounds containing a plurality of epoxide functional groups useful in the compositions of this invention can be monomeric or resinous. Examples of usable monomeric compounds fitting this description are dicyclopentadiene dioxide, vinylcyclohexene dioxide, butadiene dioxide, 1,5-pentadiene dioxide, divinyltoluene dioxide and the like. Examples of usable resinous compounds include such resins as the reaction products of polyhydric phenols with polyfunctional epoxide compounds in such proportions as to have terminal epoxy groups and epoxidized polydiolefins, such as butadiene, methyl butadiene, dimethylbutadiene, and the like. A large number of usable phenolepoxide compounds of the type described are disclosed in Greenlee U.S. Patents 2,585,115 and 2,589,245. A typical resin prepared by reacting epichlorohydrin with 2,2-bis (p-hydroxyphenyl) propane has the theoretical structural formula

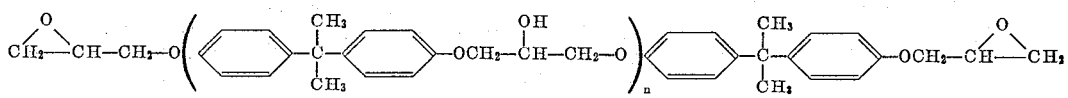
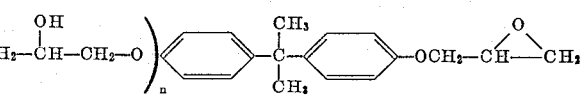

where $n$ is 0 or an integer up to 10, usually 2 or 3. Several such resins are commercially available products. The epoxidized polydiolefins can be prepared by reacting a polymer of a conjugated diene with a lower aliphatic peracid in the ratio of about one mole of the peracid for each epoxide functional group sought to be introduced into the polymer molecule. The preparation of epoxidized polydiolefins is more fully described in Greenspan et al., U.S. Patents 3,010,976 and 2,826,556, inter alia.

The polyamide resins which are useful as cross-linking additives in the compositions of this invention are relatively low molecular weight polymers of the general formula

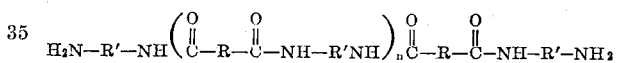

where R and R' are saturated or unsaturated aliphatic radicals and $n$ is 0 or an integer from about 1 to 10. They are prepared by the condensation of a dibasic fatty acid with a slight excess of an alkylene diamine. These resins have molecular weights generally in the range of 1,000 to 10,000 and softening points in the range of 0 to 190° C. A typical example of such a resin is the reaction product of dilinoleic acid and ethylene diamine. The preparation of these resins is described in greater detail in Cowman et al., U.S. Patent 2,450,940, Renfrew et al., U.S. Patent 2,705,223, Peerman et al., U.S. Patent 2,881,194 and Peerman et al., U.S. Patent 2,886,543, inter alia.

The etherified amine-aldehyde resins are alcohol-soluble, thermosetting resins prepared by condensation of an excess of a lower aliphatic aldehyde, such as e.g. formaldehyde or acetaldehyde, with urea or melamine and etherification of the resulting product with a 3 to 8 carbon alkanol such as propanol, butanol, isobutanol, n-hexanol or the like. The etherification is effected by carrying out the condensation in the presence of the alkanol or by adding the alkanol after condensation has taken place. This is normally accomplished in an acid environment. Many such resins are available commercially. More details of the preparation and properties of these resins are disclosed in Moore, U.S. Patent 2,218,474, Robinson et al., U.S. Patent 2,346,083, Myers, U.S. Patent 2,367,423 and Encyclopedia of Chemical Technology 1, 758 (1947).

The maleic-modified propylene polymers employed in the present invention are solid, resinous polymeric materials containing about 0.05 to about 5%, and preferably about 0.25 to about 4%, chemically combined maleic anhydride by weight of the polymer. Such modified polymers can be prepared by reacting maleic anhydride with any solid propylene polymer, either amorphous or crystalline, containing active centers or sites which are capable of anchoring the maleic anhydride thereon. Active centers at which anchoring will occur can readily be induced on the propylene polymers in known ways, as for example, by subjecting the polymer to the action of high energy ionizing radiations or by contacting the polymer, either as a solid or a solution in a solvent, with a free radical-producing material such as dibenzoyl peroxide, dilauroyl peroxide, dicumyl peroxide, t-butyl perbenzoate, and the like. Preferably, the modified propylene polymers are prepared by reacting maleic anhydride with a solution of the polymer in an organic solvent containing a free radical-producing material, such method being described in Belgian Patent 607,269. The propylene polymer which serves as a starting material for the preparation of these modified polymers can either be an amorphous polymer, otherwise known as atactic polypropylene, or a crystalline polymer of syndiotactic or isotactic structure. Amorphous polypropylene is generally preferred as the starting material because its maleic anhydride modification is soluble at ordinary temperatures in a variety of common organic solvents and thus the application of the modified polymer by ordinary solution techniques is possible. Maleic anhydride-modified crystalline polypropylene is not soluble in common solvents except at relatively high temperatures, and therefore is generally applied as a dispersion following which the coating is baked to effect fusion. It can, however, be applied from a hot solution if desired.

In accordance with the preferred embodiments of the invention, the cross-linking agent is added to the maleic anhydride-modified propylene polymer in an amount between about 0.5 and about 25% based on the weight of the propylene polymer. Generally speaking, the additive is added to the modified propylene polymer in an amount such that the concentration of the cross-linking functional group is at least equal to that of the acid or anhydride functional group.

The data presented in the following table illustrate the improved resistance to corrosion creepage of a prime coating, applied to panels of iron phosphate treated steel, which results from the addition of the cross-linking agents of the instant invention to both amorphous and crystalline maleic anhydride-modified polypropylene. When the polymer was modified amorphous polypropylene, the polymer and the resinous cross-linking agent were dissolved in a common solvent and the coating was applied to the metal from this solution. In the case of the epoxy resin and the epoxidized polybutadiene, the solvent was toluene-methyl isobutyl ketone mixture; with the polyamide resin, toluene was used; and with the etherified amine-aldehyde resin, toluene, xylene or butanol was used. When the polymer was maleic anhydride-modified crystalline polypropylene, the modified polymer was dispersed in a solution of the cross-linking agent in solvent as specified above and this dispersion was applied to the metal. The primer coats were applied to the substrates by brushing and were air dried for about 30 minutes prior to the application of the topcoat.

Each prime coating was then topcoated with a 3 mil coating of crystalline polypropylene, stabilized with 0.5% crotonaldehyde-butylated cresol reaction product and 0.25% dilaurylthiodipropionate. The topcoat was applied in two coats by spraying a dispersion of 100 parts of crystalline polypropylene particles having an average diameter of 30–50 mils in 300 parts xylene, air drying for 15 to 20 minutes, baking for 5 minutes at 400° F., recoating, baking 7 minutes at 400° F., and then quenching in water at room temperature.

Corrosion creepage resistance was evaluated on the coated panels and simultaneously on several control panels coated with maleic anhydride-modified polypropylene without the cross-linking agent of this proposal. These evaluations were performed by cutting a score mark through both the topcoat and the primer and exposing the panel to a salt fog environment for 500 hours at a temperature of about 95° F. The salt fog environment was created by atomizing 5% aqueous NaCl. After exposure, the coatings were peeled back perpendicularly from the score mark as far as possible. Results reported are the distance that the coatings could be peeled readily.

TABLE

| Example No. | Primer Type | Percent MA | Cross-linking Additive | Additive Concentration, percent (4) | Primer Thickness, (mils) | Salt-Fog Test Corrosion Creep (inches) |
|---|---|---|---|---|---|---|
| 1 | Amorphous | 1.5 | None | | <0.05 | 3/16 |
| 2 | Crystalline | 1.4 | do | | ~0.2 | 3/8–1/2 |
| 3 | do | 1.4 | do | | <0.05 | 3/16 |
| 4 | Amorphous | 1.5 | Epoxy resin 1 | 1 | 0.2–0.5 | ~1/16 |
| 5 | do | 1.5 | do | 5 | 0.2–0.5 | <1/16 |
| 6 | do | 1.5 | do | 10 | 0.2–0.5 | ~1/16 |
| 7 | Crystalline | 1.4 | do | 5 | <0.2 | 1/8 |
| 8 | Amorphous | 1.5 | Etherified amine aldehyde resin 2 | 1 | 0.2–0.5 | ~1/8 |
| 9 | do | 1.5 | do | 5 | 0.2–0.5 | ~1/8 |
| 10 | do | 1.5 | do | 10 | 0.2–0.5 | 1/16–1/8 |
| 11 | Crystalline | 1.4 | do | 5 | <0.2 | 1/8 |
| 12 | Amorphous | 1.5 | Polyamide resin 3 | 1 | 0.2–0.5 | 1/16–1/8 |
| 13 | Crystalline | 1.4 | do | 5 | <0.2 | 1/8 |
| 14 | do | 1.4 | Epoxidized polybutadiene | 1 | >0.2 | <1/8 |
| 15 | do | 1.4 | do | 5 | <0.2 | <1/8 |
| 16 | do | 1.4 | do | 10 | <0.2 | <1/8 |
| 17 | Amorphous | 1.4 | do | 5 | <0.3 | <1/8 |

1 Reaction product of ~2 moles epichlorohydrin with ~1 mole of 2,2-bis(p-hydroxyphenyl) propane.
2 Reaction product of 1 mole of melamine and 3 moles formaldehyde etherified with ~2 moles n-butanol.
3 Reaction product of polymerized soybean oil acids and triethylene tetramine.
4 Based on modified polypropylene.

The improved resistance of the cross-linked primer coatings to corrosion creepage is readily seen from the data in the table.

The examples show only the improved corrosion creepage resistance of the maleic anhydride-modified polypropylene coatings applied to iron phosphate treated steel. It must be understood, however, that the benefits of this invention are not limited to this substrate. The phenomenon of corrosion creepage is a problem with other metal substrata such as aluminum, stainless steel, copper, etc. The compositions of this invention exhibit improved resistance to corrosion creepage no matter what metal is employed as a substrate.

As previously stated, the occurrence of corrosion creepage is particularly a problem with relatively thick primer coatings, on the order of 0.1 to 1 mil. Thus the addition of the cross-linking agent to the maleic anhydride-modified polypropylene is particularly helpful when it is desired to apply such a thick coating. However, improved coatings are achieved at any thickness from about .01 to 1 mil.

What I claim and desire to protect by Letters Patent is:

1. A composition comprising maleic anhydride-modified polypropylene containing about 0.25 to about 5%, based on the weight of polypropylene of chemically combined maleic anhydride and about 0.5 to about 25% based on the weight of maleic anhydride-modified polypropylene of a cross-linking agent therefor selected from the class consisting of polyamide resins having the general formula

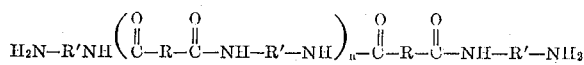

where R and R' are aliphatic radicals and $n$ is 0 to 10, and etherified amine-aldehyde resins, selected from the class consisting of urea-aldehyde and melamine-aldehyde resins.

2. A composition comprising maleic anhydride-modified polypropylene containing about 0.25 to about 5%, based on the weight of polypropylene of chemically combined maleic anhydride and about 0.5 to about 25% based on the weight of maleic anhydride-modified polypropylene of a polyamide resin prepared by the reaction of polymerized soybean oil acids and triethylene tetramine.

3. The composition of claim 2 where the maleic anhydride-modified polypropylene is amorphous polypropylene.

4. The composition of claim 2 where the maleic anhydride-modified polypropylene is crystalline polypropylene.

5. A composition comprising maleic anhydride-modified polypropylene containing 0.25 to 5%, based on the weight of polypropylene of chemically combined maleic anhydride and 0.5 to about 25% based on the weight of maleic anhydride-modified polypropylene of an etherified amine-formaldehyde resin prepared by etherifying the reaction product of about 1 mole of melamine and about 3 moles of formaldehyde with about 2 moles of n-butanol.

6. The composition of claim 5 where the maleic anhydride-modified polypropylene is amorphous polypropylene.

7. The composition of claim 5 where the maleic anhydride-modified polypropylene is crystalline polypropylene.

References Cited

UNITED STATES PATENTS 3,250,823  5/1966  Zeitlin _____ 260—857

FOREIGN PATENTS 607,269  8/1960  Belgium.
693,098  8/1964  Canada.

MURRAY TILLMAN, *Primary Examiner.*

SAMUEL H. BLECH, *Examiner.*

P. LIEBERMAN, *Assistant Examiner.*